United States Patent Office 2,937,077
Patented May 17, 1960

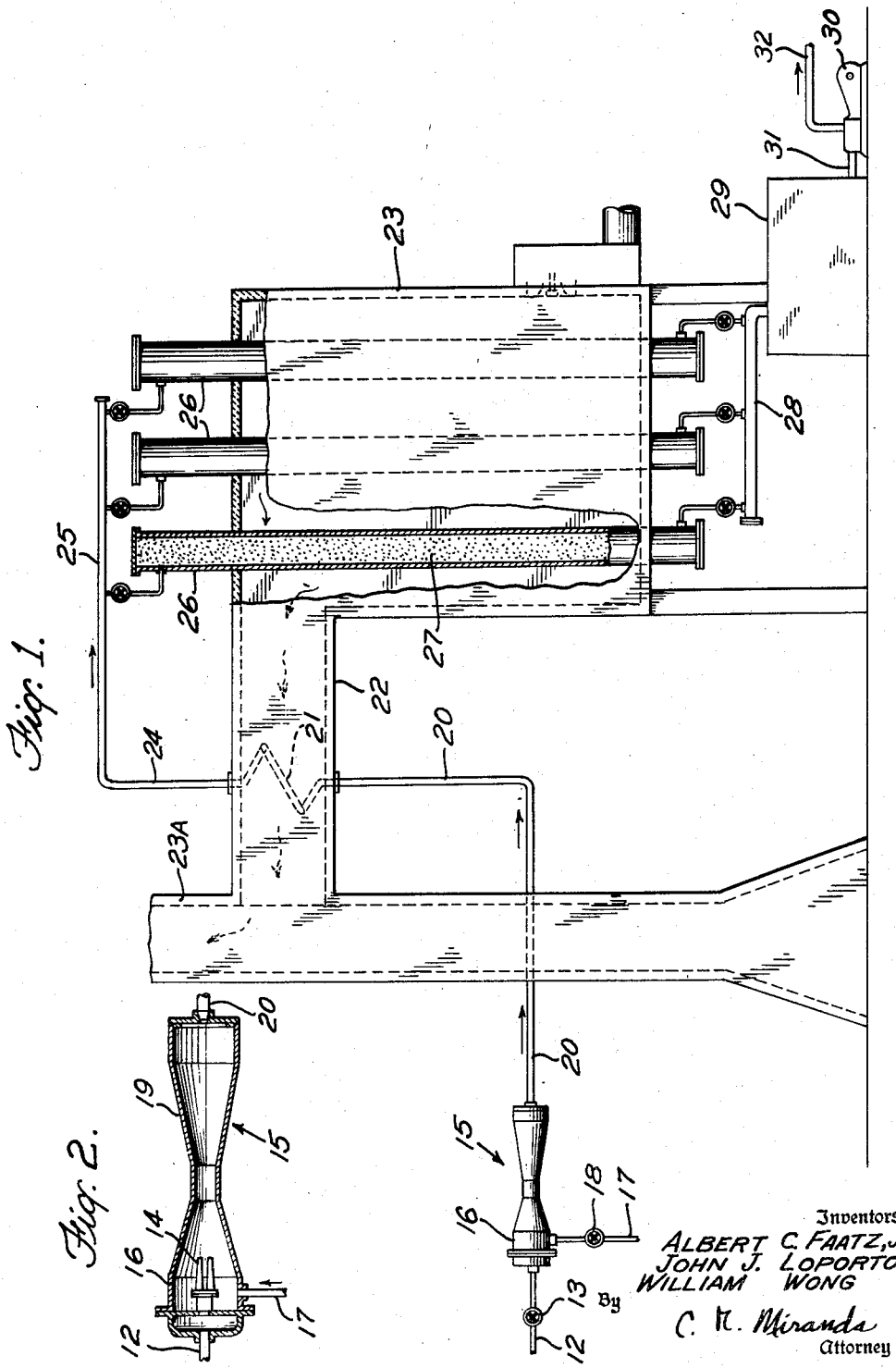

2,937,077
PROCESS FOR CHEMICAL REACTION OF FLUIDS

Albert C. Faatz, Jr., Montclair, and John J. Loporto, Cliffside Park, N.J., and William Wong, Levittown, N.Y., assignors to Foster Wheeler Corporation, New York, N.Y., a corporation of New York Application May 5, 1954, Serial No. 427,808

1 Claim. (Cl. 23—212)

This invention relates to apparatus and process for chemical reaction of fluids and more particularly to apparatus and process in which fluids are intimately mixed prior to undergoing chemical reaction.

In chemical reaction arrangements, as for example catalytic reaction arrangements for the production of hydrogen, a fluid hydrocarbon is mixed with a fluid oxidizing agent such as steam, or other compounds containing oxygen, and the mixture is passed through catalyst beds where heat is supplied to the mixture to cause a reaction which produces a resultant or reactant fluid rich in free hydrogen. The reactant fluid may be further processed for purification of the hydrogen therein and fed to a compressor which raises the pressure of the reactant fluid for ultimate use of the consumer. In the foregoing arrangement, the catalyst is usually arranged in parallel-flow tubular members which are in heat exchange relationship with combustion gases from a furnace, and the fluid mixture, in passing through the catalyst and purification apparatus is subject to an appreciable pressure drop. The pressure of the reactant fluid at the suction line of the compressor is determined largely by the pressure at which the steam and hydrocarbon mixture is available, and by the contemplated pressure drop through the catalytic reaction equipment and the subsequent equipment for hydrogen purification. In such arrangements, the residual, unconverted hydrocarbon fluid in the hydrogen allowed by the consumer determines the amount of catalyst which must be employed which, in turn, determines the total surface area of the catalyst containing tubes. When the catalyst is placed in a few long tubes, the cost of the apparatus generally is reduced and the uniformity of flow among the several tubes is improved, but since long tubes result in high pressure drops a compressor of greater suction capacity must be provided in order to compress the same quantity (or mass) of reactant fluid to the desired discharge pressure. Generally, a compromise is reached in which the number of tubes and their lengths are made consistent with the pressure which is available in the steam and hydrocarbon mixture, and with the pressure at which the reactant gases must issue from the catalyst tubes in order to be able to pass through subsequent purification equipment before reaching the compressor.

In the catalytic reaction arrangement disclosed hereinabove, the fluid hydrocarbon and fluid oxidizing agent, such as steam, are combined in a single conduit which communicates with a mixing chamber where the fluids are mixed. In most cases, the steam utilized in the reaction is at a pressure usually considerably higher than the pressure of the fluid hydrocarbon. Since the steam need not be much more than the fluid hydrocarbon pressure in order that the two be combined, the extra steam pressure is wastefully dissipated through a throttling valve to reduce the pressure of the steam substantially to the pressure of the fluid hydrocarbon. For this reason, the pressure at which the fluid hydrocarbon is available, generally determines the compressor suction pressure.

The present invention contemplates novel apparatus and process wherein a pair of fluids, at different pressures, are intimately mixed and delivered to a reaction zone at a pressure intermediate the pressures of the pair of fluids. In a specific application of the present invention for producing gases rich in hydrogen, a fluid oxidizing agent and a fluid hydrocarbon are fed to a combined pump and mixer which intimately mixes the gases and provides a mixture having a pressure intermediate the pressures of the fluid oxidizing agent and fluid hydrocarbon. The mixture is subjected to heat and passed through a catalyst to produce a resulting or reactant gas rich in free hydrogen. The resulting gas is then passed through purification equipment, after which the gas is fed to a compressor.

The invention will be understood from the following description when considered in connection with the accompanying drawing wherein one embodiment of the present invention is illustrated:

Fig. 1 is a schematic illustration of one embodiment of the present invention;

Fig. 2 is a sectional view of the combined pump and mixer of Fig. 1.

Referring now in detail to the drawing, reference numeral 12 designates a conduit connected to a source (not shown) of high pressure fluid oxidizing agent, as for example steam across a throttling valve 13. Conduit 12 conducts the steam to a nozzle 14 of a combined pump and mixer, such as a conventional jet ejector 15, the nozzle of which is arranged in the head portion 16 of the ejector. A conduit 17 communicates head portion 16 with a source (not shown) of fluid hydrocarbon in gaseous state for example, across a throttling control valve 18. Jet ejector 15 may be a steam jet ejector of the type commonly employed to produce vacuums or to exhaust permanent gases from surface condensers. In the ejector, the high potential energy of the steam is "mixed" with the lower potential energy of the hydrocarbon gas; potential energy being measured by pressure level. The mixture of gases issues from a throat portion 19 of ejector 15 and possesses a medium potential energy or medium pressure level. The final pressure level of the mixed gases depends on the efficiency of the ejector, on the relative quantities of steam and hydrocarbon gas, and upon the initial steam and hydrocarbon gas pressures. It may be readily understood that the ejector provides for the acceleration of the mixed gases for short periods of time to very high linear velocities, so that the resulting turbulence is efficacious for promoting thorough mixing of the steam and the hydrocarbon gas.

The mixture of gases leaving throat portion 19 of ejector 15 has a pressure intermediate the pressure values of the steam and gas, and is fed through a line 20 to a preheater 21 arranged in a flue passage 22 communicating with a furnace 23 and a stack 23A. A conduit 24, connected to preheater 21, conducts the gas mixture to an inlet manifold 25 from which the mixture is distributed among reaction tubular members 26 of which only three are shown, connected in parallel flow relationship and disposed substantially in the furnace 23. Tubular members 26 are filled with a suitable catalyst 27, as for example alumina impregnated with nickel, and are arranged in heat exchange relationship with combustion gases in furnace 23. The mixture of steam and hydrocarbon gas in passing through the tubular members 26 reacts to form a resulting gas rich in hydrogen and contains lesser amounts of carbon monoxide, carbon dioxide, and unconverted hydrocarbons, predominately methane.

An outlet manifold 28 is connected to tubular members 26 through separate lines and collects the resulting or reactant gas discharged from the tubular members. Conventional purification or refinement equipment, shown as a box 29 in the drawing, communicates with outlet manifold 28 to receive and further refine the reactant gas to thereby produce a gas richer in hydrogen. The gas from equipment 29 is fed to the intake or suction side of a compressor 30 by way of a conduit 31, which compressor raises the pressure of the gas to a desired value. The outlet of compressor 30 is connected by way of a conduit 32 to storage tanks (not shown) or to hydrogen utilization apparatus (not shown), as desired.

In operation, the steam and hydrocarbon gas are delivered to ejector 15 which acts as a combined pump and mixer to intimately mix the gases and raise the pressure of the mixture to a value intermediate the pressures of the steam and gas. The mixture passes through line 20, preheater 21 and conduit 24, from whence it flows into inlet manifold 25 and is delivered in parallel flow relationship to the tubular members 26. The heat in furnace 23 causes a reaction in the gas mixture passing through the tubular members to thereby produce a resulting or reactant gas rich in free hydrogen. The reactant gas is then passed to the purification equipment 29 and from the latter to compressor 30 which raises the pressure of the gas to the desired value.

In prior arrangements, the steam had to be throttled to the lower pressure of the hydrocarbon gas. With the arrangement of the present invention, the pressure of the hydrocarbon gas may be the same as that in prior arrangements, but the steam is not throttled to the same pressure as the hydrocarbon gas so that the pressure of the resulting mixture of the steam and hydrocarbon gas prior to passing through the reaction and purification equipment is greater. As a result, the compressor suction pressure is greater than that in prior arrangements so that a compressor of smaller size and lower power requirements may be utilized. If the size compressor employed and the length and number of the reaction tubular members are the same both in the present invention and in the arrangements heretofore used, it may be readily seen that it is possible to obtain a greater amount of the steam hydrocarbon gas mixture to pass through the reaction and purification equipment and the compressor than is possible with prior arrangements.

It will now be apparent that the present invention provides an improved apparatus and process for reactions in which fluids are intimately mixed prior to undergoing chemical reactions. By increasing the pressure of the steam and hydrocarbon gas mixture prior to reaction as done in the present invention, a smaller compressor may be utilized, or a greater amount of product may be obtained without adding to the expense of the arrangement. The use of a jet ejector, possessing no moving parts, provides for the simultaneous increase in the pressure of the steam and hydrocarbon gas mixture and the intimate mixing thereof. Furthermore, all of the energy in the steam is employed in a useful manner rather than being wastefully dissipated as in the prior arrangements.

The present invention is also applicable to a catalytic reaction where a product composed predominantly of hydrogen and carbon monoxide is desired and such product is obtained by reacting natural gas with a mixture of steam and carbon dioxide. In the foregoing case, the concept of the present invention is still applicable in that a series of mixer-boosters may be employed wherein the two highest pressure fluids are mixed in a first stage and the combined fluids or resulting stream, at intermediate pressure, is used to raise the pressure of the third fluid at the lower pressure in a second mixer-booster.

Of course, if more than three fluids are to be mixed then additional mixer-boosters are employed.

Although one embodiment of the present invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

The process of preparing hydrogen, which comprises the steps of passing reactants comprising gaseous hydrocarbons under one pressure and steam under a pressure substantially higher than the first mentioned pressure into a jet ejector, passing both gases into the venturi portion of said jet ejector to intimately mix both gases and provide a mixture having a pressure intermediate said first and second mentioned pressures, passing said mixture from said jet ejector through a catalyst bed, and heating said mixture in its passage through said catalyst bed to provide a gas containing free hydrogen.

References Cited in the file of this patent

UNITED STATES PATENTS

| 1,659,948 | Fox | Feb. 21, 1928 |
| 1,822,992 | Jones | Sept. 15, 1931 |
| 1,904,439 | Freyermuth | Apr. 8, 1933 |
| 2,228,171 | Lutherer et al. | Jan. 7, 1941 |
| 2,491,518 | Riblett | Dec. 20, 1949 |
| 2,524,840 | Shapleigh | Oct. 10, 1950 |
| 2,537,708 | Scharmann | Jan. 9, 1951 |

OTHER REFERENCES

Perry: Chemical Engineers Handbook, 3rd edition, 1950, pp. 1203, 1215, McGraw-Hill Book Co., Inc.